United States Patent [19]
Briar et al.

[11] 3,869,268
[45] Mar. 4, 1975

[54] METHOD AND APPARATUS FOR CHOPPING FIBERS

[75] Inventors: Thomas J. Briar, Trafford; William L. Schaefer, Gibsonia, both of Pa.

[73] Assignee: PPG Industries, Inc., Pittsburgh, Pa.

[22] Filed: Dec. 11, 1973

[21] Appl. No.: 423,838

[52] U.S. Cl............................ 65/2, 65/9, 65/11 R, 83/345, 83/347, 83/913
[51] Int. Cl............................................. C03b 37/02
[58] Field of Search .............. 65/2, 9, 11 R; 83/345, 83/347, 913; 198/220

[56] References Cited
UNITED STATES PATENTS

| | | | |
|---|---|---|---|
| 2,699,208 | 1/1955 | Schur................................ | 83/347 X |
| 3,362,524 | 1/1968 | Holman............................. | 198/220 |
| 3,452,400 | 7/1969 | Kane et al........................ | 198/220 X |
| 3,508,461 | 4/1961 | Stream............................. | 83/345 X |
| 3,570,363 | 3/1971 | Thomas............................ | 83/345 X |
| 3,731,575 | 5/1973 | Gelin............................... | 65/11 R X |
| 3,771,981 | 11/1973 | Sears et al....................... | 65/11 R X |

*Primary Examiner*—Robert L. Lindsay, Jr.
*Attorney, Agent, or Firm*—Robert DeMajistre

[57] ABSTRACT

A method and apparatus for chopping glass fibers during formation is disclosed. The glass fibers are drawn from cones of molten glass by attenuation and sized with an aqueous sizing composition. The attenuation is provided by a pair of rotating circumferentially juxaposed wheels; one wheel having a knurled surface contacting a second smooth flexible surfaced wheel. As the glass fibers are attenuated by these two wheels, they are also cut or chopped by passing the fibers between a second smooth surfaced wheel and a juxaposed cutting head thereby forming particulate glass fiber bundles of uniform length. The particulate glass fibers are dropped onto a two-stage vibratory conveyor; the first stage operating at a higher amplitude than the second stage. During the second stage conveying operation the glass fiber bundles are reduced in moisture content by applying heat to the fibers. The glass fiber bundles are collected by providing a foraminous section at the end of the vibratory conveyor through which the particulate glass fiber bundles pass through and into a collecting device.

15 Claims, 6 Drawing Figures

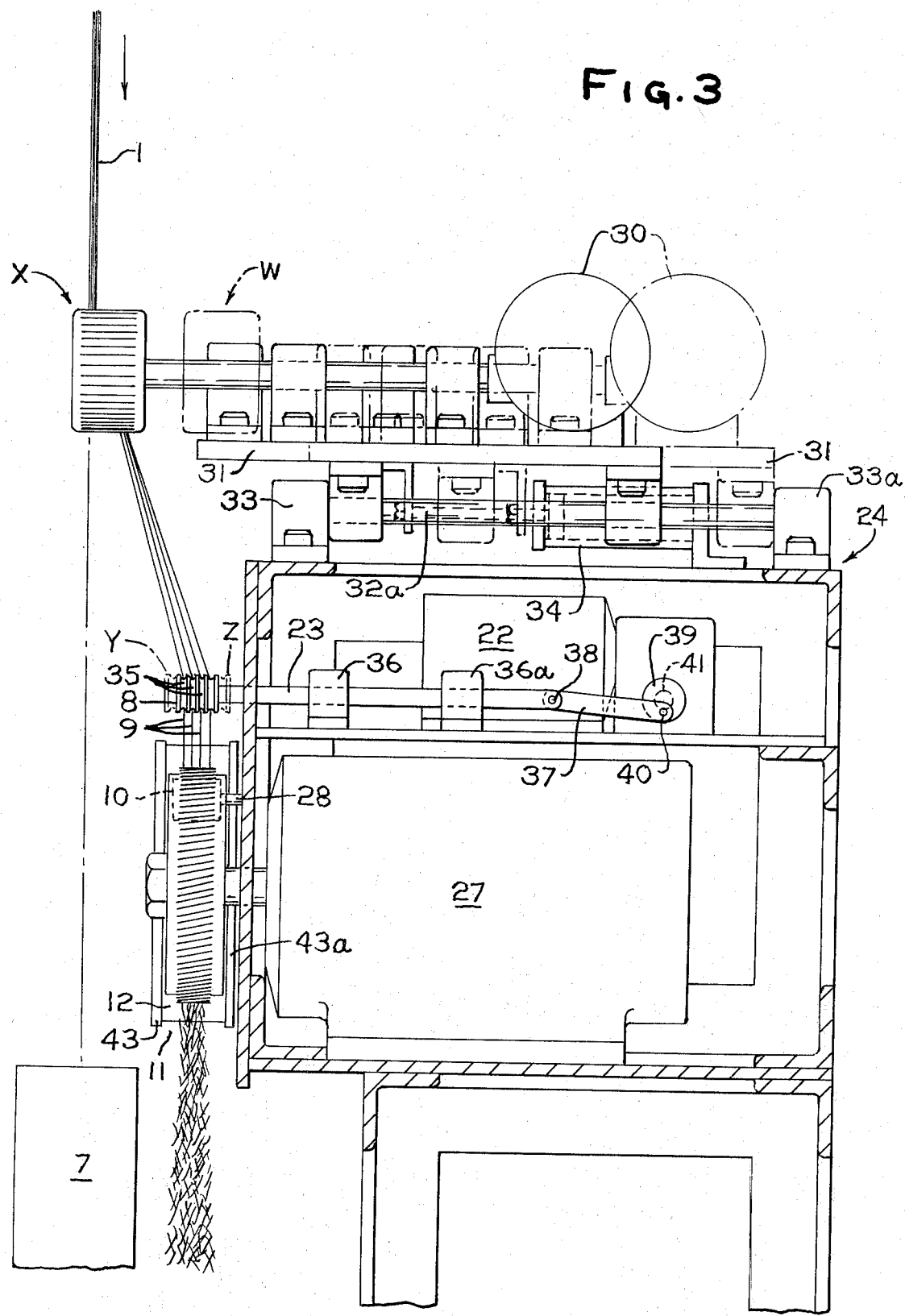

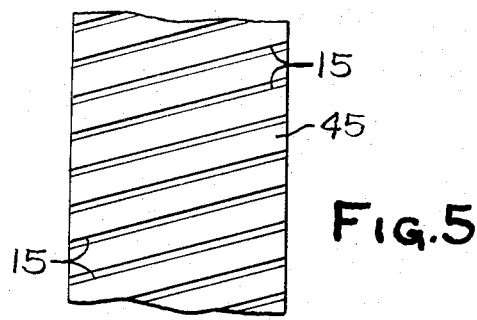
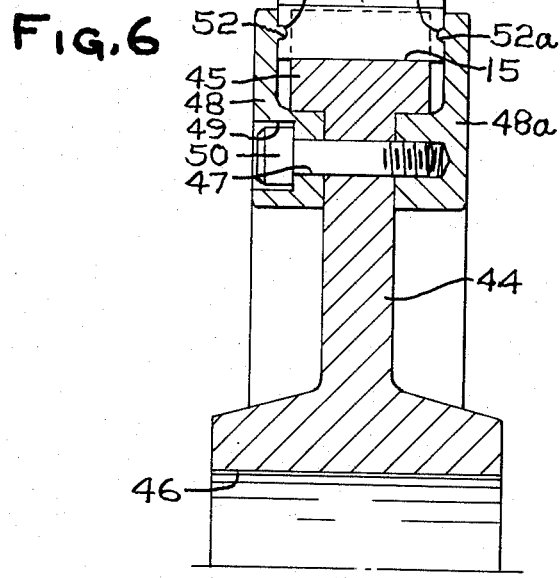
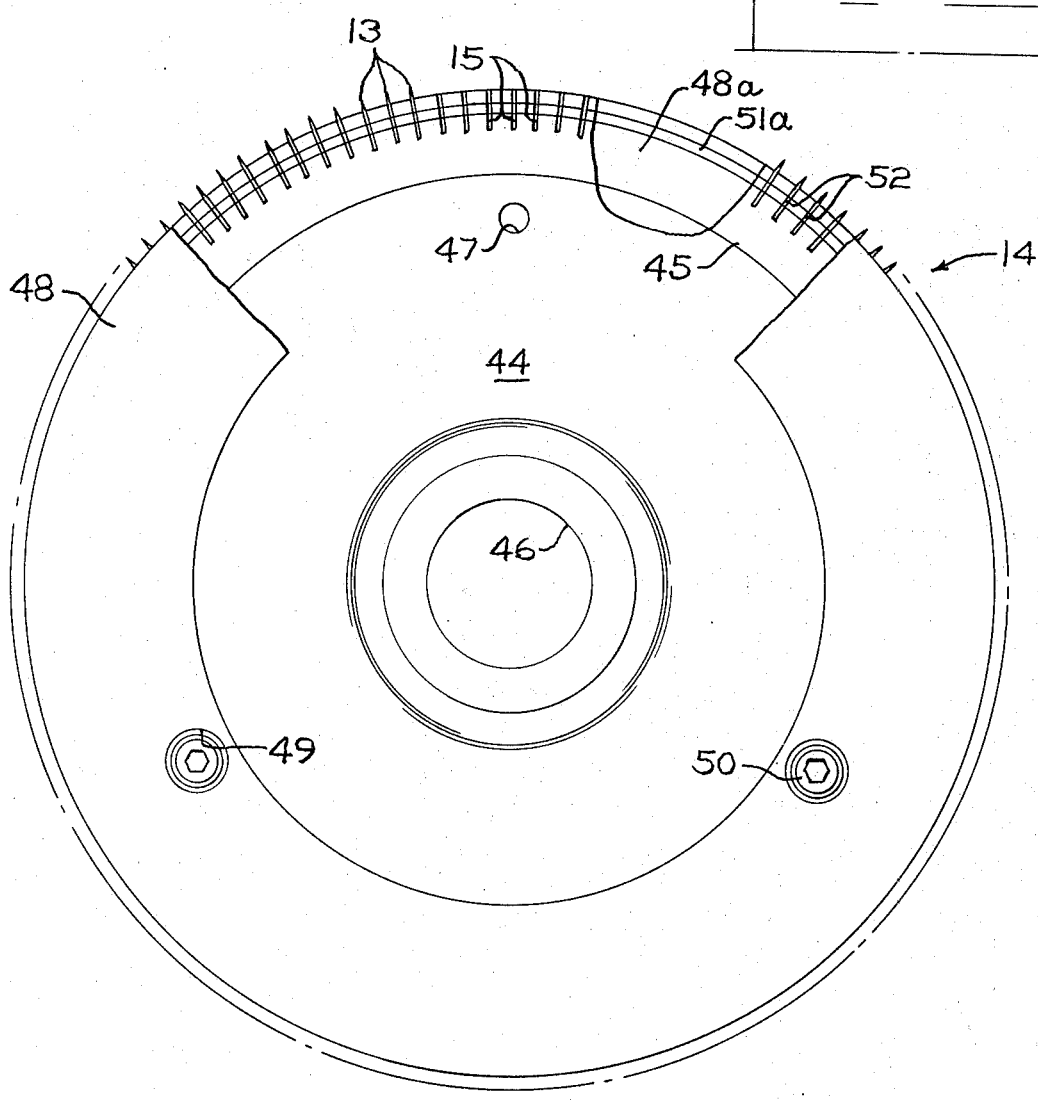

METHOD AND APPARATUS FOR CHOPPING FIBERS

BACKGROUND OF THE INVENTION

1. Field of the Invention

This invention relates to a method and apparatus for producing glass fiber bundles of uniform length, during formation.

2. Description of the Prior Art

Glass fibers are formed from molten cones of viscous glass being attenuated from a platinum-containing bushing having a plurality of orifices. The speed of attenuation, the viscosity of the glass and the size of the orifice determine the diameter of the fiber which is formed. Thus, the high viscosity of the glass and a large orifice size will contribute to a relatively large diameter fiber and an increased speed of attenuation will contribute to a relatively small diameter fiber. Additionally, it is desirable to maintain the speed of attenuation, the orifice diameter, and the viscosity of the glass at a constant level in order to produce a uniform diameter fiber. The viscosity of the glass can be kept at a constant level by maintaining a uniform glass composition and forming temperature; the orifice size, due to the composition of the bushing remains constant over a long period of use in forming; therefore both viscosity and orifice size are readily controlled by the manufacturers of glass fibers. However, the speed of attenuation has been found to vary due to mechanical changes in attenuation devices and the method by which fibers are attenuated.

A common method of attenuation involves winding fibers on a rotating drum operating at a constant speed, however as the glass fibers build up on the drum, the effective diameter of the drum is increased thus increasing the attenuation speed of the fibers, forming a thinner fiber on the outside of the package than on the inside of the package. Additionally, the process of forming the fibers must be interrupted to remove the full package from the winder.

Another method of attenuating glass fibers is that of drawing the fibers through a belt attenuator. The fibers are drawn through two smooth contacting surfaces traveling in a parallel path. At a predetermined point the belts are moved away from each other and the glass fibers are released into the desired collecting device. This method is very effective for uniform attenuation of the fibers. However, a continuous strand cannot be easily collected for further use requiring linear processing.

During the formation of the fibers it is necessary to apply a sizing composition to the filaments. This sizing composition usually consists of a lubricant, to prevent abrasion among the fibers to eliminate breakage of the fine filaments and a binder, to bind the fibers into a uniform bundle when strand is being formed. Additionally the sizing composition must have adhesion to the glass fibers and also be compatible with the final use of the glass fibers. Thus, problems have been encountered in formulating sizing compositions having the necessary properties to promote a useful glass fiber product.

Glass fiber strand is formed from a plurality of sized glass fiber filaments which have been drawn together. This strand is wound on a forming package and then unwound to be further processed for a plurality of uses. Of particular importance is glass fiber chopped strand which is useful for resin reinforcement, glass fiber paper and the like. The usual method of producing chopped glass fiber strand is to unwind the strand from a forming package after the fibers are formed and pass it through a cutting device. This is a costly operation because the strand must be both wound and unwound causing high handling costs and excessive waste due to losses in end finding and creeling.

The instant invention provides a method and apparatus for both forming glass fibers and chopping glass fibers in a continuous operation.

Additionally, a method and apparatus for constant speed attenuation is provided by the instant invention thus producing filaments of a uniform diameter.

Further, the instant invention provides a method and apparatus for forming glass fibers which requires much less complicated sizing formulations and a broader range of properties available in these sizing formulations.

Still further, the method and apparatus of the instant invention provide a continuous integrated efficient process for producing chopped glass fiber strand.

Other advantages of the instant invention will become apparent with the further description thereof.

SUMMARY OF THE INVENTION

The instant invention provides a method of chopping glass fibers during formation involving attenuating glass fibers from molten cones of glass from a bushing, sizing the glass fibers, and gathering the fibers into a plurality of strands. The attenuation is accomplished by a pair of rotating circumferentially juxaposed wheels; one having a knurled surface, the second wheel having a flexible smooth surface. The strands are chopped by passing the strands from the attenuation wheels to an attenuation zone which is the flexible smooth surfaced wheel and a third wheel having a plurality of cutting edges mounted in slots on the surface thereof, the slots being 0.002 to 0.004 inch greater than the thickness of the mounting portion of the cutting edge implanted therein. The first two juxaposed wheels, i.e., the flexible surfaced wheel and a knurled wheel, provide the total means for attenuating the glass fibers. The chopped glass fibers emanating from the contact below the third wheel and the flexible smooth surface wheel are deposited on a two-stage vibratory conveyor, the first having a higher amplitude than the second, the second stage having provided therewith means for drying the glass fiber strand. The terminal portion of the second stage vibratory conveyor is foraminous in order to pass the glass fiber chopped strand from the conveyor into a collecting means. A novel apparatus for carrying out the above inventive method is also provided.

BRIEF DESCRIPTION OF THE DRAWINGS

FIG. 3 is a side elevational view partially in section of the apparatus of FIG. 2.

FIG. 4 is a cross-sectional view of the cutter head with the cutting edges placed therein.

FIG. 5 is a front view of the central wheel of the cutter head.

FIG. 6 is a partial sectional view of the cutter head with the blades placed therein.

Referring to FIG. 1, fine glass filaments or fibers 1, are drawn through an 80 percent platinum — 20 percent rhodium alloy bushing 2, having a plurality of orifices 3. The fibers 1 are sized, before contacting each other, with a sizing composition. This sizing composition can be any aqueous size which provides compatibility with the final use of the fibers and affords adequate binding properties to adhere the single filaments to each other to form a strand. A wide variation of sizes may be used in the process of the instant invention. Due to the integration of the forming and chopping processes, there is no need for providing sizes which protect the fibers during winding, unwinding and like steps. The sizing composition is applied by passing the filaments 1 over a roller applicator 4, which is immersed in a bath 5, of the sizing composition. The bath 5 is usually fed by pumping the size from a hold tank, now shown, to the bath 5.

Figure 1:
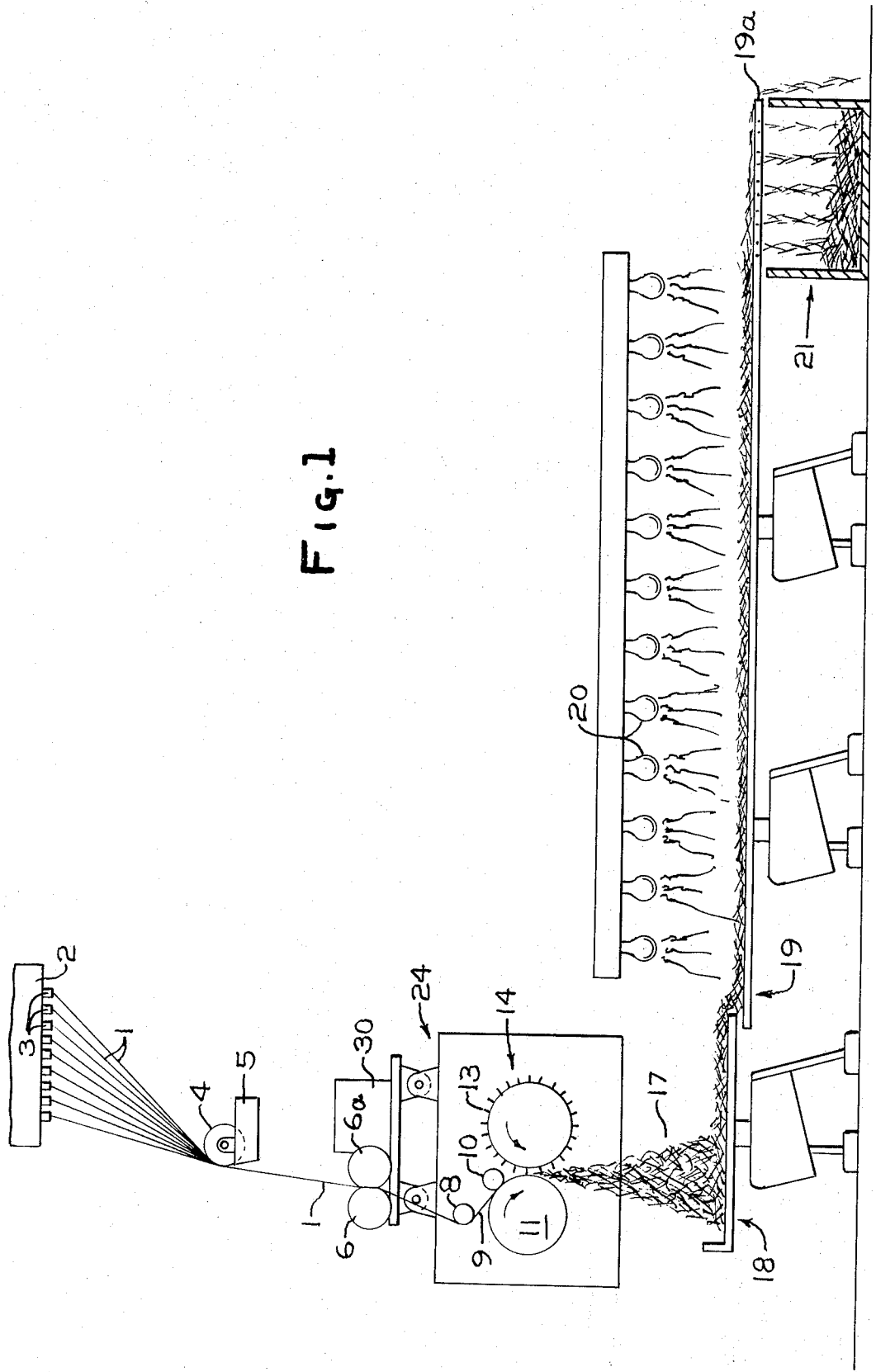
FIG. 1 is a schematic diagram of the apparatus and process by which the glass fibers are formed, chopped, dried and packaged.

The filaments 1 are passed through a pair of start-up rolls, or pull rolls 6 and 6a, which attenuate the fibers 1 at a low speed to begin the fiber forming process. While the pull rolls 6 and 6a are in operation, the glass fibers being formed are disposed of by means of a waste chute, not shown in FIG. 1. When the process is begun, the glass fibers 1 being formed are placed through a guide or gathering shoe 8, which is generally a grooved cylinder which gathers the filaments 1 together and forms them into the desired number of strands 9. The gathering shoe 8 traverses through a small distance of travel across the face of wheel 12 (about 1/16 to ½ inch) by a traversing means not shown in FIG. 1.

The strands 9 are passed through a free wheeling feed roll 10 which aligns the strands 9 for the cutting action. The feed roll 10 has a knurled surface to provide tractive force between the strands 9 and the roll 10.

The feed roll 10 is in contact with a cot roll or backup roll 11. Having the strand 9 in contact with both rolls 10 and 11, provides the attenuation necessary to form the fibers 1. Generally the fibers 1 are attenuated at speeds of from 2,000 to 3,000 feet per minute.

The cot roll 11 is composed of a flexible material removably mounted on an annular plate, not shown in FIG. 1. The flexible material can be a natural rubber, a synthetic rubber, a polyurethane or the like provided the exterior surface of the cot roll 11 has a Shore A hardness of 50 to 90 and has adequate flexibility to grip the feed roll 10 and the cutting edges 13.

The strand 9 is passed between the cot roll 11 and the cutting edges 13. The cutting edges 13 are mounted in grooves on a cutter head 14 having a plurality of grooves, not shown in FIG. 1, oriented transversely and oblique with the axis of the cutter head 14. The grooves, not shown, must have a width of 0.002 to 0.004 inch greater than that of the cutting blades 13 in order to reduce vibration and extend the life of the cutting edges 13. The transverse oblique mounting of the grooves not shown in FIG. 1, which hold the cutting edges 13 in place, is effected to provide gradual contact with the cutting edges 13 as they contact the cot roll 11. This mounting arrangement reduces vibration of the cutting unit and prolongs blade life by reducing instantaneous compressive force on the cutting blades 13 when contacting the cot roll 11.

Thus, the strands 9 are formed in the traversing gathering shoe 8 and attenuated by the feed roll 10 contacting the cot roll 11 with the strand 9 being pulled between the rolls 10 and 11. The strand 9 is then chopped by the blades 13 while contacting the cot roll 11.

The chopped strands or particulate glass fiber bundles 17 then fall onto a first vibratory conveyor 18, which agitates the chopped strand 17 which has a moisture content from about 9 to 11 percent by weight due to the aqueous size previously applied. The vibratory action maintains the chopped strand 17 in discrete glass fiber bundles rather than having the bundles adhering to each other.

The chopped strand 17 is passed from the first vibratory conveyor 18 to a second vibratory conveyor 19 having an amplitude of vibration less than the first vibratory conveyor 18. Associated with the second vibratory conveyor 19 is a heating area, in this case a plurality of infrared bulbs 20. As the chopped strand 17 is conveyed along the second conveyor 19, it is reduced in moisture content to less than 0.1 percent by weight by the applied heat. Means other than the infrared bulbs 20 can be used to supply the heat necessary for moisture reduction, such as a forced air oven or the like.

The terminal portion 19a of the second conveyor 19 is foraminous in order that the dried chopped strand 17 falls through the apertures in the conveyor and into a collection package 21. Over size material is removed at the end of the conveyor.

Additionally, if the glass fiber bundles 17 are not of the proper size, they will not pass through the apertures in the foraminous portion 19a of conveyor 19, thus being isolated from the desired size product which is a chopped strand of uniform length.

Figure 2:
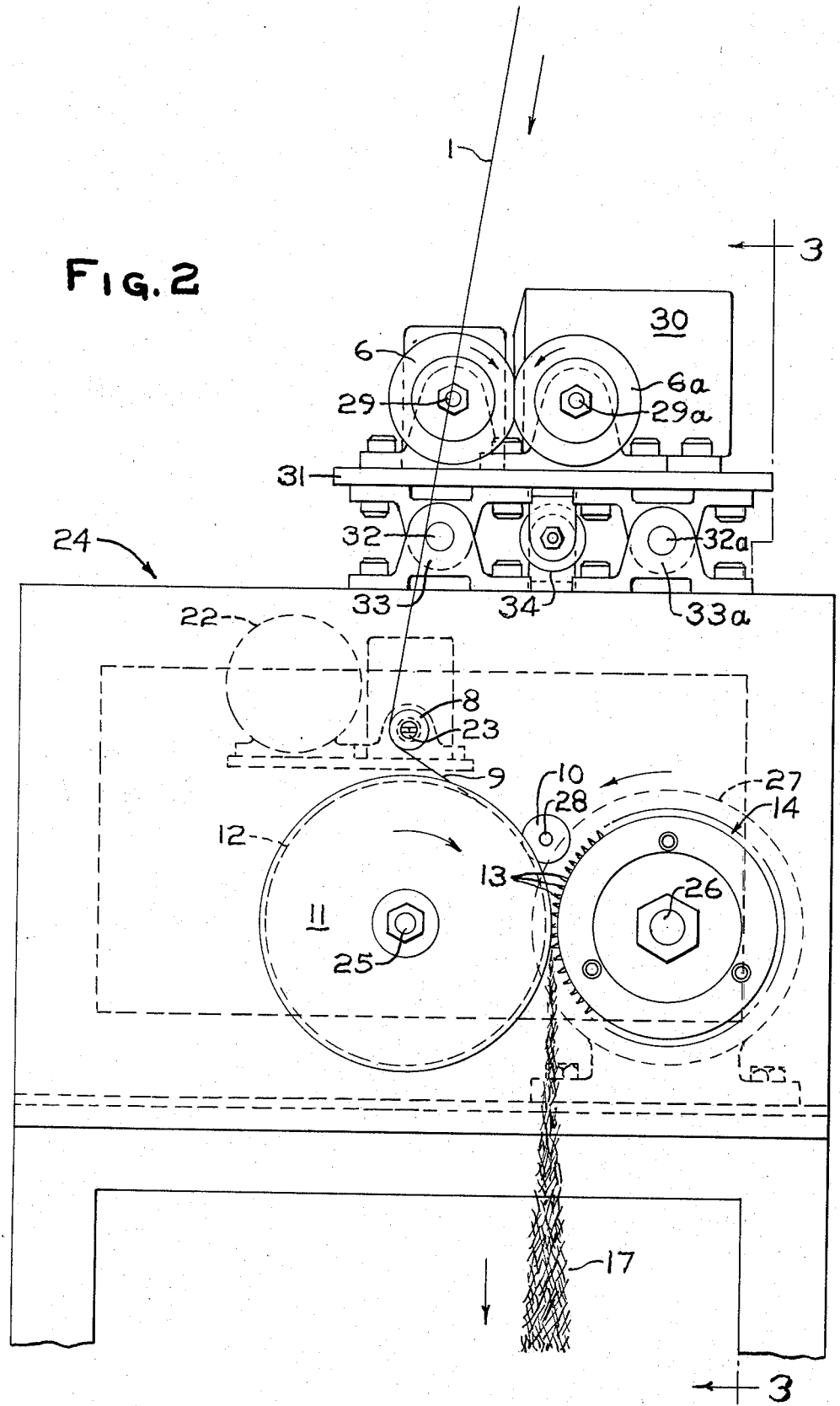
FIG. 2 is a front view partially in section of the startup rolls and the cutter mechanism.

Referring now to FIG. 2 which shows the glass fiber strand chopped with the start-up rolls unengaged. The glass fibers 1 are passed over the traversing gathering shoe 8 mounted on a shaft 23. The gathering shoe 8 has a plurality of grooves not shown which divides the filaments 1 into a plurality of strands 9 equal to the number of grooves on the gathering shoe 8. The gathering shoe 8 is laterally transversed across roll 11 to randomly lay the strands 9 in contact with the cot roll 11 and cutting edges 13 in order to prolong the life of the roll 11 and edges 13 by providing for uniform wear. The traversing is accomplished by means of a motor 22 driving the shaft 23. The gathering shoe 8 in this instance is fixedly mounted about the shaft 23. The motor 22 with the shaft 23 mounted thereon is enclosed in a housing 24 with the shaft 23 extending outwardly therefrom. The gathering shoe 8 is usually constructed of graphite; however, other materials of construction may be used as long as proper lubricity is provided to prevent breakage of the filaments 1 being gathered into strands 9.

The cot roll or backup roll 11 is constructed of a flexible material such as a natural, synthetic or polyurethane rubber having a Shore A hardness of 50 to 90. This hardness is necessary to provide both flexibility for tractive force and compressibility and hardness for adequate cutting of the strands 9. The cot roll 11 may be of a dual composition having the exterior surface composed of a hard material with an underlying core composed of a material having greater flexibility than the exterior surface of the roll.

The cot roll 11 is mounted on a shaft 25 which is mounted on the interior of the housing 24.

The cutter head 14 is mounted on a shaft 26 driven by a motor 27 mounted inside the housing 24. The cutter head 14 is rotated by the motor 27 and the cutting edges 13 contact the free wheeling cot roll 11 thereby rotating the cot roll 11. The cot roll 11 contacts the knurled free wheeling feed roll 10 thus rotating the feed roll 10 on the shaft 28 mounted in the housing 24. The motor 27 provides adequate force to drive rolls 10 and 11 thereby attenuating the fibers 1 at about 2,000 to 3,000 feet per minute. The feed roll 10 and cot roll 11 grip and draw the strand 9 thus attenuating the fibers 1 from the bushing (not shown in FIG. 2) and divert the strands between cot roll 11 and the cutting edges 13 thereby cutting the strands 9 into particulate glass fiber bundles 17.

The start-up rolls 6 and 6a are each mounted on a shaft 29 and 29a respectively, shaft 29 being driven by a motor 30. The motor 30 is mounted on a platform 31, the platform 31 being slidably mounted on shafts 32 and 32a which are permanently affixed to mounts 33 and 33a. The mounts 33 and 33a are secured to the housing 24.

Referring now to FIG. 3 which shows a side view of FIG. 2 partially in section of the cutting method and apparatus which demonstrates the position of the start-up rolls 6 and 6a in the start-up and run position. In the start-up position x, the filaments 1 are drawn through the start-up rolls 6 and 6a and disposed of through a waste chute 7. When the chopping process is begun, the filaments 1 are drawn through the start-up rolls 6 and 6a at a relatively low speed (about 300 feed per minute) and fed through the gathering shoe 8, between the cot roll 11 and the feed roll 10 which attenuates the fibers 1 and places the strand 9 into the chopping area. When the attenuation speed of the feed roll 10 and cot roll 11 exceeds the attenuation speed of the start-up rolls 6 and 6a an air piston 34 is activated which moves the platform 31 over the shafts 32 and 32a into the run position w shown in phantom.

The filaments 1 are gathered into strands 9 by the gathering shoe 8 having a plurality of grooves 35 on the surface thereof. The number of strands 9 formed will normally be equivalent to the number of grooves 35 on the gathering shoe 8. If all grooves are not used it will be understood that a lesser number of strands will be formed. As the filaments 1 are gathered into strands 9, the gathering shoe 8 traverses from the y position to the z position to promote promote uniform wear of the cutting edges 13 and cot roll 11. The traversal is accomplished by mounting the gathering shoe 8 on a shaft 23 held by mounts 36 and 36a within the housing 24; the shaft 23 being connected to a toggle arm 37 by means of a pin 38. The toggle arm 37 is mounted on a rotating wheel 39 (acting as a crank) by means of a pin 40. The rotating wheel 39 is fixedly mounted on a shaft 41 which is rotated by a motor 22. Thus, the length of travel of the gathering shoe 8 is determined by the position of the shaft 37 in relation to the center of the wheel 39. As the distance of the pin 40 from the center of the wheel 39 increases, the length of travel of the gathering shoe 8 increases.

The strands 9 are passed from the gathering shoe 8 to the cot roll 11 and feed roll 10 where they act to attenuate the filaments 1. The cot roll 1 is mounted on an annular plate (not shown). The flexible surface 12 of the cot roll 11 is composed of a natural rubber, a synthetic rubber, a polyurethane rubber or the like having a Shore A hardness of 50 to 90. The surface is to have adequate hardness to provide for acceptable wear characteristics and adequate flexibility to drive the feed roll 10. A dual composition flexible surface 12 may be provided having a hard exterior in relation to a more flexible interior.

The flexible surface 12 is mounted about the circumference of an annular plate (not shown) by providing end fasteners 43 and 43a which overlap the flexible surface 12 and the annular plate, not shown. The end fasteners 43 and 43a are removably mounted to provide facilitation of rapid replacement of a worn flexible surface 12.

The strands 9 are fed between the cot roll 11 and feed roll 10 to a position where the strands 9 are cut by the cutting edges 13 mounted on the cutter head 14, mounted on the shaft 26 which is driven by the motor 27. Thus, the strands 9 are cut into particulate glass fiber bundles 17 by the cutting edges 13 by forcing the strands 9 between the cutting edges 13 and the flexible surface 12.

Referring now to FIG. 4 there is shown a front view of the cutter head 14 with the cutting edges 13 placed therein, part in section and parts broken away.

The cutter head 14 having an annular plate portion 44 has a rim 45 attached at the outer circumference thereof. The rim 45 has a plurality of grooves 15 traversing the width of the rim 45. Cutting edges 13 are mounted within the grooves 15. Necessarily, the grooves must be 0.002 to 0.004 inch larger than the mounting section of the cutting edges 13 in order to provide adequate holding of the cutting edges 13 and for an acceptable vibration level. The cutting edges 13 extend above the rim 45 to expose the periphery of the cutting edges 13. An aperture 46 in the plate 44 is provided for mounting on a shaft (not shown in FIG. 4). The plate 44 is also provided with threaded apertures 47 for mounting securing plates 48 and 48a which hold the cutting edges 13 in place. The securing plates 48 an 48a are grooved annular channels which have apertures 49 and 50 aligned with the apertures 47 in the plate 44.

Cutting edges 13 may be placed alternately in the grooves 15 to provide a larger length of chopped glass fiber strands 17. However, when alternating cutting edges 13 in the grooves 15, enough edges 13 must be supplied so that at least two edges 13 are in contact with the cot roll at all times. If larger length chopped strand is desired, the diameter of the cot roll and/or cutter head 14 may be increased.

Referring now to FIG. 5 there is shown the grooves 15 traversing the rim 45 oblique to the axis of rotation of the cutter head 14. Thus, when the cutting edges 13 contact the flexible surface 12 of the cot roll 11, the cutting edges 13 are subjected to gradual stress rather than instantaneous stress thereby prolonging the life of the cutting edges 13 and reducing vibration in the chopping apparatus.

Referring now to FIG. 6, a cutting edge 13 is shown mounted in a groove 15 in the rim 45 which is attached to the plate 44 having the shaft mounting aperture 46 therein. The end fasteners 48 and 48a are attached to the plate 44 by means of a screw 50 through the apertures 47 and 49. The cutting edge 13 is mounted by semicircular protrusions 51 and 51a provided in the end fasteners 48 and 48a which hold the cutting edge 13 by semicircular grooves 52 and 52a provided in the sides of cutting edge 13. A sharpened metal blade is normally used as the cutting edge 13. Of particular utility as cutting edges are standard injector razor stock machined in the shape as above described.

From the foregoing description it will be apparent that the instant invention provides an efficient apparatus and method for chopping glass fiber strands to form particulate glass fiber bundles. Further, although the description above is to a specifically constructed apparatus and method, the invention is not to be limited in any way only insofar as is set forth in the accompanying claims.

We claim:

1. A method of preparing particulate glass fiber strand comprising:
   forming a plurality of continuous glass filaments from a glass fiber bushing;
   applying a size to said filaments;
   consolidating said filaments into one or more continuous glass fiber strands;
   passing said strand or strands into an attenuation zone, attenuating said strand or strands and the filaments associated therewith in said zone;
   passing the strand or strands from said attenuation zone to a cutting zone;
   feeding said strand or strands between cutting blades and a resilient surface capable of being depressed by said cutting blades, to thereby cut said continuous strand or strands into discrete lengths;
   controlling the vibration of the cutting blades while cutting said strand into discrete lengths by holding said blades in a mounting maintained between 0.002 to 0.004 inch greater than the width of the mounting section of said blades; and
   collecting said discrete lengths of glass fiber strand so formed.

2. A method of preparing particulate glass fiber strand comprising:
   forming a plurality of continuous glass filaments from a glass fiber bushing;
   applying a size to said filaments;
   consolidating said filaments into one or more continuour glass fiber strands;
   passing said strand or strands into an attenuation zone, attenuating said strand or strands and the filaments associated therewith in said zone;
   passing the strand or strands from said attenuation zone to a cutting zone;
   feeding said strand or strands between cutting blades and a resilient surface capable of being depressed by the cutting blades, to thereby cut said continuous strand or strands into discrete lengths;
   controlling the vibration of the cutting blades while cutting said strand into discrete lengths by holding said blades in a mounting between 0.002 to 0.004 inch greater than the width of the mounting section of said blades;
   passing the discrete lengths of glass fiber strands onto a two-stage vibratory conveyor;
   vibrating the first stage of said conveyor to propel said discrete lengths of glass fiber strand along said first stage of said conveyor to the second stage of said conveyor;
   vibrating said second stage of said conveyor at a lower amplitude than said first stage of said conveyor;
   providing a foraminous section at the terminal end of said second stage of said vibratory conveyor to selectively isolate the preferred lengths of said glass fiber strands; and
   collecting the discrete lengths of glass fiber strand thus formed.

3. A method of preparing particulate glass fiber strand comprising:
   forming a plurality of continuous glass filaments from a glass fiber bushing;
   applying a size to said filaments;
   passing said filaments into a first attenuation means, attenuating said filaments by said first attenuation means;
   consolidating said filaments into one or more continuous glass fiber strands;
   passing said strand or strands into a second attenuation means, having a second attenuation means associated therewith;
   releasing said first attenuation means when said second attenuation means applies attenuative forces to said filaments and the strand or strands associated therewith;
   feeding said strand or strands between cutting blades and a resilient surface capable of being depressed by said cutting blades, to thereby cut said continuous strand or strands into discrete lengths;
   controlling the vibration of the cutting blades while cutting said strand into discrete lengths by holding said blades in a mounting between 0.002 to 0.004 inch greater than the width of the mounting section of said blades; and
   collecting said discrete lengths of glass fiber strand so formed.

4. A method of preparing particulate glass fiber strand comprising:
   forming a plurality of continuous glass filaments from a glass fiber bushing;
   applying a size to said filaments;
   passing said filaments into a first attenuation means, thereby attenuating said filaments by said first attenuation means;
   consolidating said filaments into one or more continuous glass fiber strands;
   passing said strand or strands into a second attenuation means, attenuating said strands in said second attenuation means;
   releasing said first attenuation means when said second attenuation means applies attenuative forces to said filaments, and the strand or strands associated therewith;
   feeding said strand or strands between cutting blades and a resilient surface capable of being depressed by said cutting blades, to thereby cut said continuous strand or strands into discrete lengths;
   controlling the vibration of the cutting blades while cutting said strand into discrete lengths by holding said blades in a mounting between 0.002 to 0.004 inch greater than the width of the mounting section of said blades;
   passing the discrete lengths of glass fiber strands onto a two-stage vibratory conveyor;
   vibrating the first stage of said conveyor to propel said discrete lengths of glass fiber strand along said first stage of said conveyor to the second stage of said conveyor;

vibrating said second stage of said conveyor at a lower amplitude than said first stage of said conveyor;

providing a foraminous section at the terminal end of said second stage of said vibratory conveyor to selectively isolate the preferred lengths of said glass fiber strands; and collecting said discrete lengths of glass fiber strand so formed.

5. The method of claim 1 having the additional steps of:

depositing said discrete lengths of glass fiber strand in a conveying zone subsequent to said cutting; and conveying said discrete lengths of glass fiber strand through a drying zone to reduce the moisture content thereof.

6. The method of claim 2 having the additional step of:

drying the discrete lengths of glass fiber strand during its passage through said second stage of said conveyor.

7. The method of claim 3 having the additional steps of:

depositing said discrete lengths of glass fiber strand in a conveying zone subsequent to said cutting, and conveying said discrete lengths of glass fiber strand through a drying zone to reduce the moisture content thereof.

8. The method of claim 4 having the additional step of:

drying the discrete lengths of glass fiber strand during said vibration of said second stage of said conveyor.

9. An apparatus for forming and chopping glass fiber strand comprising:

a glass fiber forming bushing from which continuous filaments are drawn;

means for applying a size to said filaments;

means for consolidating said filaments into one or more continuous glass fiber strands;

a first wheel having a smooth flexible surface;

a second wheel juxaposed and contacting said first wheel at the circumferential surfaces thereof, said first wheel and said second wheel providing attenuative forces to said glass fiber strand or strands and the filaments associated therewith;

a third wheel having positioned thereon a plurality of cutting edges being mounted in a plurality of grooves provided on the periphery of said third wheel, said grooves being 0.002 to 0.004 inch greater in width than the width of the mounting portion of said cutting blades, said cutting blades being in contact with said first wheel at the circumferential surface thereof and below the point of contact of said first and second wheel, to thereby cut said glass fiber strand or strands into discrete lengths;

means for rotating said first, second and third wheels; and means for collecting the particulate glass fiber bundles formed.

10. The apparatus of claim 9 including means for traversing said consolidating means to effect uniform wear of the surface of said first wheel and said cutting edges positioned on said third wheel.

11. The apparatus of claim 9 including:

means for conveying said particulate glass fiber bundles to said means for collecting; and means associated with said means for conveying for reducing said glass fiber bundles in moisture content.

12. The apparatus of claim 11 wherein said means for conveying is a two-stage vibratory conveyor, the first stage operating at a higher amplitude than the second stage, said second stage vibratory conveyor having a foraminous portion at the end thereof through which said glass fiber bundles are passed into said means for collection.

13. The apparatus of claim 9 wherein said second wheel has a knurled surface.

14. The apparatus of claim 9 wherein said third wheel is driven by a motor and said first and second wheels are free wheeling, and driven by frictional contact of said third wheel with said first wheel and said first wheel with said second wheel.

15. The apparatus of claim 9 including an additional mechanical attenuation means for the facilitation of starting up said first attenuation means.

* * * * *